US011966476B2

(12) United States Patent
Kamble et al.

(10) Patent No.: US 11,966,476 B2
(45) Date of Patent: Apr. 23, 2024

(54) DEEP APPLICATION DISCOVERY AND FORENSICS FOR AUTOMATED THREAT MODELING

(71) Applicant: Avocado Systems, Inc., Fremont, CA (US)

(72) Inventors: Keshav Kamble, Fremont, CA (US); Chetan Gopal, Westwood, MA (US); Girish Joag, Pune (IN); Annu Agrawal, Pune (IN)

(73) Assignee: Avocado Systems, Inc., Fremont, CA (US)

( * ) Notice: Subject to any disclaimer, the term of this patent is extended or adjusted under 35 U.S.C. 154(b) by 349 days.

(21) Appl. No.: 17/322,874

(22) Filed: May 17, 2021

(65) Prior Publication Data

US 2021/0357509 A1    Nov. 18, 2021

Related U.S. Application Data

(60) Provisional application No. 63/026,133, filed on May 17, 2020.

(51) Int. Cl.
| | |
|---|---|
| *G06F 21/57* | (2013.01) |
| *G06F 16/955* | (2019.01) |
| *G06F 21/51* | (2013.01) |
| *G06F 21/52* | (2013.01) |
| *G06F 21/56* | (2013.01) |

(52) U.S. Cl.
CPC ........ *G06F 21/577* (2013.01); *G06F 16/9566* (2019.01); *G06F 21/51* (2013.01); *G06F 21/52* (2013.01); *G06F 21/564* (2013.01)

(58) Field of Classification Search
CPC ...... G06F 21/577; G06F 21/564; G06F 21/51; G06F 21/52; G06F 16/9566
USPC .......................................................... 726/25
See application file for complete search history.

(56) References Cited

U.S. PATENT DOCUMENTS

| | | | |
|---|---|---|---|
| 10,193,889 B2 | 1/2019 | Kamble | |
| 10,382,459 B2* | 8/2019 | Harris | ................... H04L 63/108 |
| 10,673,902 B2* | 6/2020 | Thomas | .................. H04L 63/20 |
| 11,086,984 B2* | 8/2021 | Shannon | ............... H04L 9/0891 |

(Continued)

*Primary Examiner* — Samson B Lemma
(74) *Attorney, Agent, or Firm* — BEKIARES ELIEZER LLP

(57) ABSTRACT

In an embodiment, a method for deep application discovery and forensics of a reference system includes a computing device, such as an orchestrator, receiving and/or obtaining from an inspection layer executing on the reference system, during runtime of the reference system, architecture and configuration information describing the reference system. Also, the computing device generates, during runtime of the reference system, dependency matrices describing relationships between components of the reference system which allow for generation, during runtime of the reference system, at least one threat model describing vulnerabilities of the reference system based on the dependency matrices. The inspection layer identifies the applications and databases accessed by the applications. From this information, the inspection layer discovers components associated with the applications and databases, APIs, URIs, URLs, and individual processes spawned by the applications, along with storage tables, and store-procedures invoked between the applications and the databases.

20 Claims, 10 Drawing Sheets

(56) References Cited

U.S. PATENT DOCUMENTS

| | | | |
|---|---|---|---|
| 2014/0201838 A1* | 7/2014 | Varsanyi | G06F 21/552 726/23 |
| 2016/0337400 A1* | 11/2016 | Gupta | H04L 63/1416 |
| 2019/0236273 A1* | 8/2019 | Saxe | G06N 3/045 |
| 2019/0268302 A1* | 8/2019 | McDonald | H04L 63/10 |
| 2019/0306181 A1* | 10/2019 | Mahadevia | H04L 63/1441 |
| 2021/0336934 A1* | 10/2021 | Deshmukh | H04L 63/105 |

* cited by examiner

DEEP APPLICATION DISCOVERY AND FORENSICS FOR AUTOMATED THREAT MODELING

INCORPORTION BY REFERENCE; DISCLAIMER

This application is hereby incorporated by reference: application No. 63/026,133 filed on May 17, 2020. The Applicant hereby rescinds any disclaimer of claim scope in the parent application or the prosecution history thereof and advises the USPTO that the claims in this application may be broader than any claim in the parent application.

TECHNICAL FIELD

The disclosure generally relates to application and system security, and more particularly to automated threat modeling for protecting systems and applications through deep application discovery and forensics.

BACKGROUND

Threat modeling involves building an environment and testing the environment against internal and external threats. The environment is modeled to simulate an operating system and applications deployed thereon. Testing this environment helps to gain a comprehensive understanding of how application and data attacks surface in order to build a solid defensive strategy to eliminate and isolate such attacks. Threat modeling is a complicated, multiple step process that requires expertise from many different disciplines in order to obtain a useful result.

BRIEF DESCRIPTION OF THE DRAWINGS

Reference symbols in the various drawings that have the same number indicate like elements.

DETAILED DESCRIPTION

Figure 1:
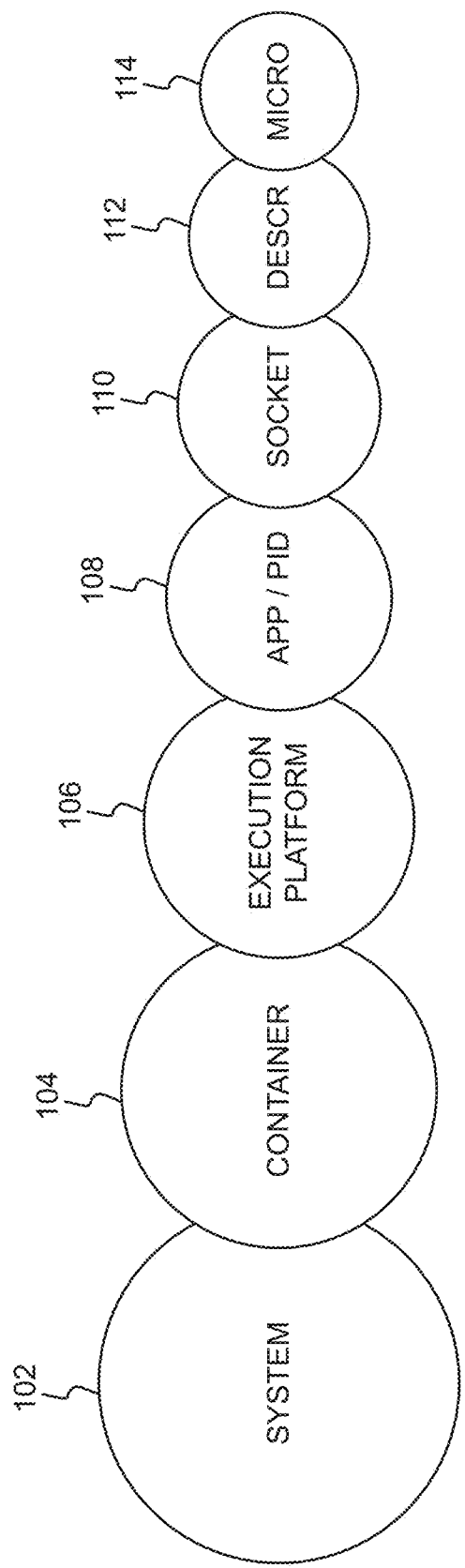
FIG. 1 shows an example hierarchy of elements for threat modeling.

In the following descriptions, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. Complexity of Threat Modeling
3. Hierarchy of Elements
4. System Architecture
5. Application Architecture
6. System Flow
7. Example Embodiments
8. Miscellaneous; Extensions
9. Hardware Overview
10. Computer Networks and Cloud Networks

1. General Overview

The descriptions presented herein relay sufficient information to enable a person having ordinary skill in the art to make and use the present invention and are provided in the context and requirements of particular embodiments of the present invention.

Threat modeling may be described in three steps or processes. In a first step, one or more application flow diagrams are manually created. In a second step, the flow diagram is converted into structured data. In a third step, a threat model is built based on the structured data and reported to a user.

One or more embodiments describe a method for deep application discovery and forensics of a reference system. The method includes a computing device, such as an orchestrator, receiving and/or obtaining from an inspection layer executing on the reference system, during runtime of the reference system, architecture and configuration information describing the reference system. Also, the computing device generates, during runtime of the reference system, dependency matrices describing relationships between components of the reference system which allow for generation, during runtime of the reference system, at least one threat model describing vulnerabilities of the reference system based on the dependency matrices.

In an embodiment, an inspection layer executing on a reference system identifies applications that are configured to execute on the reference system (and/or currently executing on the reference system). The inspection layer also discovers every individual process executed by the applications, uniform resource identifiers (URIs) for all web resources referenced by the applications including uniform resource locators (URLs), and all application programming interfaces (APIs) utilized by the applications. The inspection layer also sends, to a computing device (such as an orchestrator) during runtime of the reference system, architecture and configuration information describing the reference system. The architecture and configuration information includes any of the following: identities of the applications, identities of every individual process executed by the applications, identification of the URIs for all web resources referenced by the applications, and identification of the APIs utilized by the applications.

According to an embodiment, an inspection layer executing on a reference system identifies applications executing on the reference system and databases accessed by the applications. From this information, the inspection layer discovers all storage tables and store-procedures invoked between the applications and the databases. Also, the inspection layer discovers, during runtime of the reference system, all database components associated with each of the databases.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms.

In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

2. Complexity of Threat Modeling

Threat modeling involves in-depth understanding and knowledge of vulnerabilities of the reference system, applications executed on the reference system, and remote resources and databases accessed by the applications. However, conventional threat modeling methods rely on manual techniques to develop information about the system being modeled. The complexity of modern application architecture, behavior of the applications, and various data flows makes it very difficult, if not outright impossible, to generate precise component, data flow, and connectivity diagrams for any reference system. Without accurate application flow diagrams, accurate threat modeling is not possible, which introduces the possibility of hidden threats in the reference system.

In order to create application flow diagrams manually, software engineers, architects, and security engineers work together to manually create simplified representations of each component of a complex application, and provide extensive details for each component. Each application flow diagram includes details about the corresponding application. These details may be represented in data flow diagrams and/or dependency maps, and may include identification and description of data encryption methods used, connectivity between various components, protocols used, port numbers used, direct and indirect connectivity to database(s), encryption of the database(s) on disk, etc.

A threat modeling tool uses structured data as an input in order to determine a threat model for the corresponding application and/or system. However, the application flow diagrams when created are not in a structured format. Therefore, the various application flow diagrams are converted into structured data to allow the threat modeling tool to use the information. Each threat modeling tool may utilize a different structured data format, and in order to obtain results from more than one threat modeling tool, multiple different structured data formats may be created from the flow diagrams. Any type of structured data may be used which is understood by a particular threat modeling tool, such as Java Script Object Notation (JSON) objects.

The structured data is used by the threat modeling tool to build a model that describes potential vulnerabilities for various components of the application as defined in the structured data file. The identification of vulnerabilities is based on manual methods or various analytical algorithms deployed by the threat modeling tool. These algorithms take the structured data as input, digest the structured data, and output possible threats associated with the described application environment. All threats predicted by a particular threat modeling tool are then reported to the user, typically in the form of graphical or tabular reports.

The output and precision of a threat prediction produced by the threat modeling tool depends upon the precision of the input. Any mistake or imprecision in the input data may result in an incorrect, inaccurate, or misleading threat model. This may result in the user missing threats to the application(s), potentially exposing vulnerabilities in the reference system. Manually feeding application data into the threat model makes it less effective and less precise, because the data provided to the threat model are based on best estimates of the people involved in manually entering the data.

Complex business applications, or the portals they use to access systems, often utilize architectures that are structured into multiple tiers, e.g., three tiers. They may use hundreds of processes; thousands of application programming interfaces (APIs), uniform resource locators (URLs), uniform resource identifiers (URIs); and millions of individual database entries. People who perform manual methods for creating flow diagrams are not able to comprehend all of these details. Consequently, outputs from the threat modeling tool(s) are approximate and not precise.

Moreover, the process of manual threat modeling may take months for a single application at a time, potentially making it extremely expensive and time-consuming to perform the process for all applications of a reference system. Accurately mapping data flows and dependencies is an exhaustive process, requiring countless meetings with developers and architects. Also, every application has different functionality and a different architecture. Knowledge of application architecture and dynamic application data flows are commonly not known or fully understood by the people entering the information. This lack of understanding results in discrepancies that may lead to massive holes in developing a threat model, leaving critical paths for cyber-attacks to damage the reference system.

3. Hierarchy of Elements

FIG. 1 shows an example hierarchy of elements for threat modeling. Additional details and/or levels of details may be included in flow diagrams automatically generated for a reference system in addition to those illustrated in FIG. 1, in various approaches. Moreover, each level of granularity may involve different information depending on which aspect of the reference system is being threat modeled. Below, example information for each level of granularity are described for a web application and for a database. Of course, more or less information at each level of granularity may be included in a flow diagram for threat modeling, in various approaches.

In an example, when threat modeling a web application, one or more flow diagrams may be automatically generated that include details from some or all of the levels of granularity shown in FIG. 1. For a web application, this includes details at a system level 102 [e.g., details for server(s), virtual machine(s) (VMs), host(s), etc.], at a container level 104 (if applicable, e.g., for a containerized reference system), at an execution platform level 106 [including platform name or type (e.g., Java, Python, binary executable, Ruby etc.), path ID or path name, and fingerprint(s) for the platform], at an application level 108 [including process identifier (PID)], at a communication socket level 110 [e.g., transmission control protocol (TCP) information, socket type, cryptography information, port number, etc.], at a data socket descriptor level 112 [specific to a client interface, e.g., descriptor, protocol, port(s), payload(s), etc.], and at a micro level 114 (e.g., unique IDs for segments, sessions, threats, etc.) including URIs, APIs, representational state transfer (REST) APIs, individual parameters, file descriptors, etc.

In another example, when threat modeling for a database, one or more flow diagrams may be automatically generated that include details from some or all of the levels of granularity shown in FIG. 1. For a database, this includes details at the system level 102 [e.g., details for server(s) (such as server internet protocol (IP) address), VMs, host(s), etc.], at the container level 104 (if applicable, e.g., when the database is containerized), at the execution platform level 106 [including platform name or type (e.g., Java, Python, binary executable, Ruby etc.), path ID or path name, and fingerprint(s) for the platform], at the application level 108 (including PID), at the communication socket level 110 (e.g., TCP information, socket type, cryptography information, port number, etc.), at the data socket descriptor level 112 [specific to a client interface, e.g., descriptor, protocol, port(s), payload(s), etc.], and at the micro level 114 (e.g., unique IDs for segments, sessions, threats, etc.) including Structured Query Language (SQL) call(s), stored procedure call(s), database table(s), etc.

4. System Architecture

Figure 2:
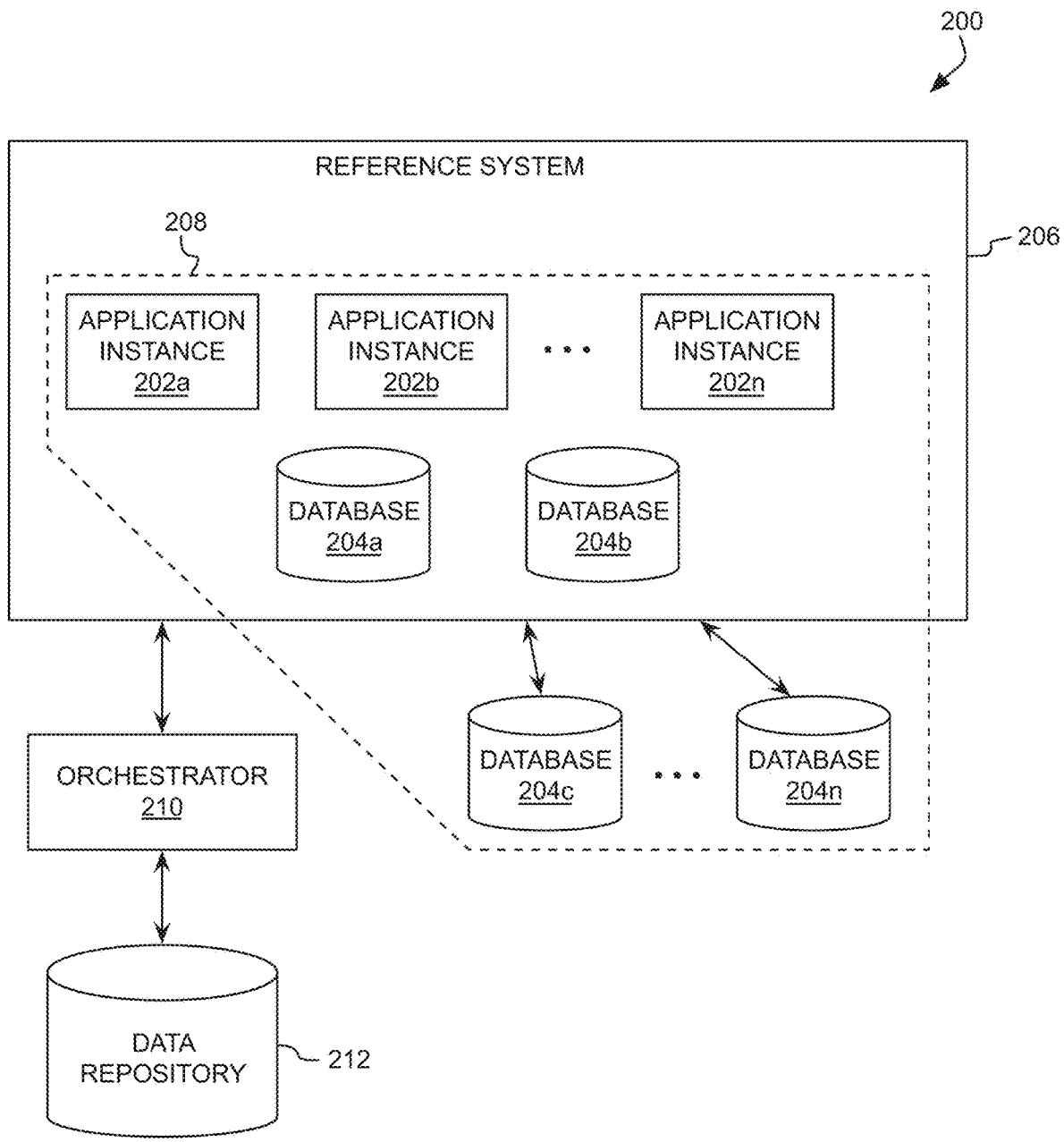
FIG. 2 is a simplified block diagram of an example system for deep application forensics and analytics.

FIG. 2 is a simplified block diagram of an example system 200 for deep application forensics and analytics. System 200 provides for automated threat modeling which is not possible using conventional methods and systems of manual threat modeling. System 200 includes a reference system 206 which may include one or more processors (not shown), an orchestrator 210 for performing application forensics and analytics, and a data repository 212 where data is stored. In one or more approaches, reference system 206 may include any type of computing device having at least one hardware processor, such as a server device, a host device, an appliance device, an application specific hardware device, etc. In one embodiment, system 200 may be configured to provide a sandbox environment that does not affect or change the software, data, settings, and configurations of reference system 206.

In one or more embodiments, data repository 212 may be configured to store data in a database (e.g., storing data for use in performing threat modeling for reference system 206). Data repository 212 may include any type of storage unit and/or device (e.g., a file system, database, collection of tables, or any other storage mechanism) for storing data. Further, data repository 212 may include multiple different storage units and/or devices. The multiple different storage units and/or devices may or may not be of the same type or located at the same physical site. Further, data repository 212 may be implemented or may execute on the same computing system as system 200. Alternatively or additionally, a portion or all of data repository 212 may be implemented or executed on a computing system separate from system 200. Data repository 212 may be communicatively coupled to orchestrator 210 and/or reference system 206 via a direct connection, via a wireless connection, via a network, or some other connection that would be apparent to one of ordinary skill in the art.

System 200 may include one or more graphical user interfaces (GUIs) for implementing various functions, features, processes, operations, etc. These GUIs may be presented on a variety of electronic devices including, but not limited to, web browsers, laptop computers, server computers, backup appliance devices, desktop computers, computer terminals, television systems, tablet computers, smartphones, etc. One or more of these electronic devices may include a touch-sensitive surface and/or display.

Reference system 206 may have any number of different applications (e.g., server applications, database applications, web applications, etc.) executing thereon, along with any number of individual application instances 202 (e.g., application instance 202a, application instance 202b, . . . , application instance 202n) of each application type instantiated at any given time. Moreover, reference system 206 may include and/or have access to any number of databases 204 (e.g., local database 202a, local database 202b, remote database 202c, . . . remote database 204n) for storing and retrieving data and information. Any format may be used to store data on the various databases 204, and each database may utilize a different storage format from any other database. In addition, the various databases 204 may have different access techniques, such as direct connections, remote access, connection via one or more networks, web access, etc.

System 200 is configured to initiate an inspection layer 208 for each application instance 202 operating on reference system 206. An individual inspection layer 208 may be initiated for each application instance 202 individually (e.g., as a plug-in, in-application process, executable, etc.) or as a single process for all applications of a single type (e.g., all instances of the same application may be monitored by a single inspection layer). Inspection layer 208 inspects, examines, and collects forensics information about the various application instances 202 and databases 204 that are accessed by the various application instances 202, including databases local to reference system 206 (e.g., local database 204a) and databases remote from reference system 206 (e.g., remote database 204c).

Each type of application 202 operated on reference system 206 includes logic for executing commands and instructions along with associated data for performing the commands and instructions. The associated data may be located in operating memory, in cache, and stored to disk or other back-end storage device(s). The associated data may be structured in relational database(s) and/or document database(s), each having different access methods. Relational databases may commonly be accessed by SQL query and/or response per table. Document databases may commonly be accessed using structured forms that include metadata for the document which adhere to a serialized data format, e.g., JSON, Binary JSON (BSON), MessagePack, YAML, Hierarchical Data Format version 5 (HDF5), syslogs, Log Event Extended Format (LEEF), etc. Other database types may be unstructured. Additional database types, such as time series databases and in memory databases may also be utilized in a reference system for data storage. The various databases 204 may be structured in any way while still being accessible to the inspection layer 208.

The forensics information that is gathered and collected by orchestrator 210 may be stored to data repository 212, or any other database or data repository accessible to orchestrator 210 for further analysis, examination, and/or transmission to other components in system 200.

In further embodiments, orchestrator 210 may be in communication with additional systems, components, networks, and/or other orchestrator(s). Orchestrator 210 may also collect forensics information and perform analysis on the forensics information for these other reference systems.

Most applications are complex, involving multiple tiers—with three tiers being common (e.g., Web Tier, Application Tier, Database Tier). Each tier has different functionality, scalability, and internal architectures. In an enterprise deployment, there may be any number of elements (e.g., applications, processes, micro services, databases, etc.) communicating with each other and operating on one or more systems, across one or more networks, and/or in one or more clouds (e.g., public clouds, private clouds, hybrid clouds). Each tier may have a monolithic architecture, a modular microservice architecture, a serverless architecture, or some other combined architecture described herein, and/or proprietary in nature to the enterprise.

Each type of system architecture represents different vulnerabilities. In this context, an objective for every enterprise is to threat model the applications 202 to ensure business-specific applications (e.g., developed for the enterprise's specific business needs) are secure by design. In order to achieve this during runtime, in one embodiment, deep discovery of applications 202, databases 204, APIs, and database store-procedures may be performed by inspection layer 208.

Moreover, deep discovery includes more than simply discovering and identifying each application 202, it also includes discovering and identifying all associated components for each application 202. Likewise, deep discovery includes more than simply discovering and identifying each database 204, it also includes discovering and identifying all associated components for each database 204.

Once the applications 202, databases 204, and all associated components are discovered and identified, a dependency map describing how applications work together is automatically generated by orchestrator 210 or some other component of system 200 which accounts for all identified elements in the reference system 206. With this dependency map, APIs, URIs, and REST APIs executed between clients and web servers are discovered and identified, along with discovering and identifying all tables and store-procedures invoked between applications 202 and databases 204 in reference system 206.

With this information, a threat surface may be automatically generated by orchestrator 210 or some other component of system 200 for each application 202, including databases 204 that may be discovered at runtime, that describes the metes and bounds of the reach that any single application 202 may have within reference system 206. Additionally, with this information, process-level, API-level, and store-procedure-level dependency matrices are automatically generated.

Using the discovered reference system information, threat model for each application, process-level dependency matrix, API-level dependency matrix, store-procedure-level dependency matrix, a specific threat model for each flow of interaction for applications is automatically generated by orchestrator 210 or some other component of system 200. This may be accomplished, in one approach, by executing the applications 202 of reference system 206 over a period of time in pre-production environments, when possible, in an approach. The applications 202 of reference system 206 may be executed over a period of time in a sand-box environment in another approach.

In another approach, applications 202 of reference system 206, using inspection layer 208, are subjected to automated functional testing and automated vulnerability penetration testing to enable inspection layer 208 to observe, detect, and identify every detail for execution paths taken by the reference system 206 and applications 202 thereof. The inspection layer 208 may be configured with standard and/or customized threat detection policies. The threat detection policies may utilize information from one or more threat modeling tools as feedback for further refining and improving the testing for reference system 206.

The following information and analysis may be gathered and performed by orchestrator 210 in conjunction with inspection layer 208:

1. Runtime discovery of every application 202 and process targeted for threat modeling. Discovery involves realizing, identifying, and gathering all details for each application 202, such as application name, PIDs, unique fingerprints, etc.
2. Runtime discovery of all inter-application communication, intra-application communication, and inter-process communication. This allows for orchestrator 210 to generate a complete communication matrix.
3. Runtime discovery of internet-based clients [e.g., IP addresses, browser details (name, operating system, versions, cookies, cryptography used, etc.), locations, etc.] that access the applications 202 over the Internet.
4. Runtime discovery of URLs and/or URIs accessed and/or invoked inside applications which reside in the web tier by requests and/or responses of clients.
5. Runtime discovery of APIs invoked by any of the applications 202 due to interaction of web tier applications.
6. Runtime discovery of database queries initiated by applications which reside in the application tier to any of the databases 204. This includes store-procedures, tables, and other query types according to the specific type of databases 204 in reference system 206.
7. Runtime discovery of real vulnerabilities exposed by functional and/or penetration testing directed and/or designed specifically for each reference system 206, each application 204, each URL, each URI, each API, each store-procedure, and each database data access method invoked during the functional and/or penetration testing.

All of the gathered information for reference system 206 described above may be stored by orchestrator 210 or some other component of system 200 in at least one structured or unstructured file. In an approach, a format of the file may be chosen to correspond with a particular threat modeling tool which will be used for generating a threat model for the reference system 206. In a further approach, multiple different file formats may be used for storing the information, to be used by multiple different threat modeling tools.

5. Application Architecture

Figure 3A:
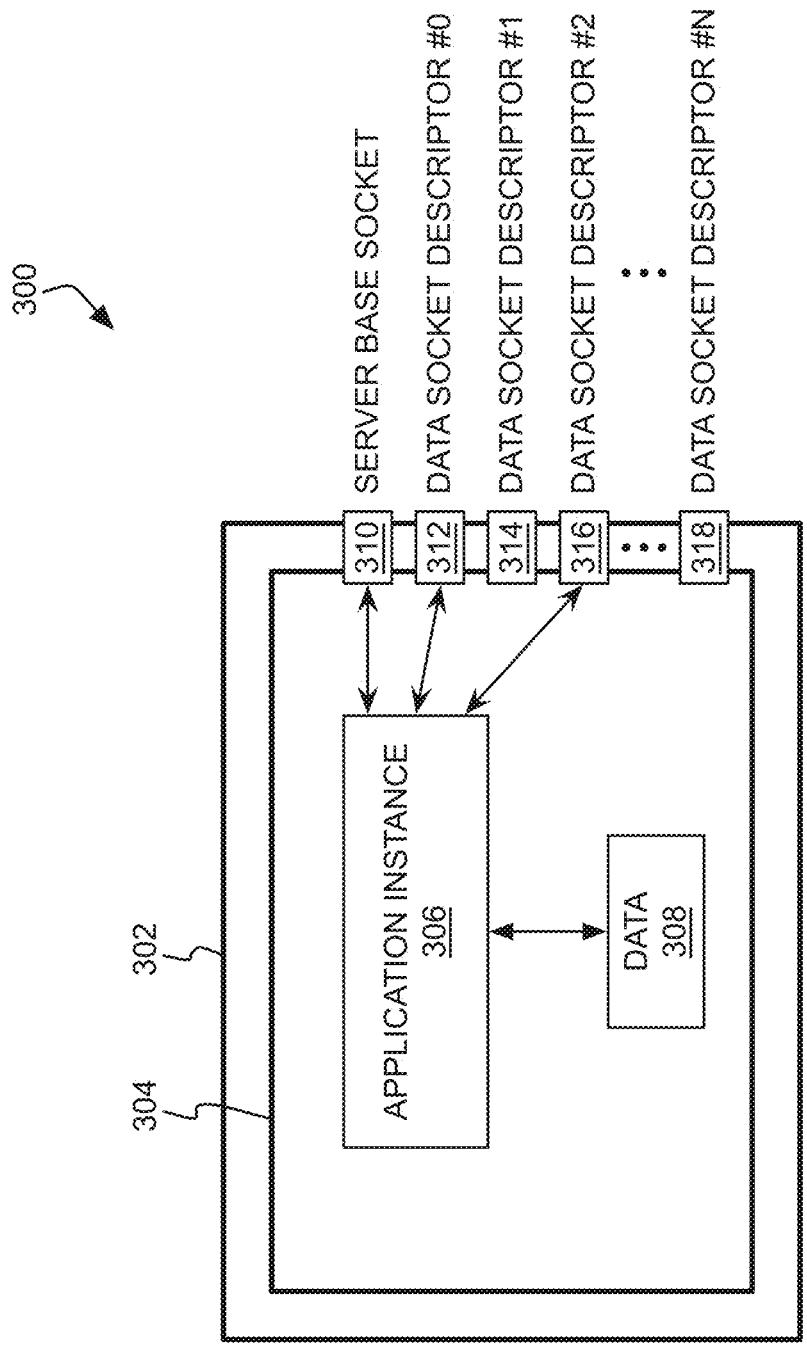
FIG. 3A shows an example logical representation of an application instance operating on a reference system.

FIG. 3A shows a logical representation of an application instance 306 operating on a reference system 300 according to one embodiment. Although only one application instance 306 and one set of data 308 is shown in FIG. 3A, as would be understood by one of skill in the art, any number of application instances and groups of data may be hosted on a reference system 300, limited only by the processing power and/or other resources available to the reference system 300.

As shown in FIG. 3A, an application inspection layer 302 and a data inspection layer 304 are represented within the reference system 300, according to one embodiment. These layers may sometimes be referred to as an application protection layer (APL) and data protection layer (DPL) in some cases. Moreover, these individual layers, when used in combination, may be referred to generally as an inspection layer, or more specifically as an application and data protection layer (ADPL).

The application instance 306 has access to data 308 within the reference system 300. Also, the application instance 306, through any number of standard and/or custom APIs, may utilize any of a plurality of data socket descriptors (e.g., data socket descriptor #0 312, data socket descriptor #1 314, data socket descriptor #2 316, . . . , data socket descriptor #N 318) with which to communicate (send and/or receive) information outside of the application instance 306 or reference system 300. One or more server base sockets 310 is provided in the application instance 306 of reference system 300 and is used for control of the peer application instances on the reference system 300, outside the system, or outside the application instance 306 itself, as would be understood by one of skill in the art.

In order to provide application and data protection to application instances of distributed, scaled out applications which have instances operating on a plurality of computing systems, at least two operations may be performed, and are described below according to one embodiment.

In one approach, application instances, such as application instance 306, are identified based upon data socket descriptor attributes that an application instance uses to communicate between other application instances and/or group(s) of application instances on/or outside of the reference system 300. For example, in response to application instance 306 utilizing data socket descriptor #0 312 consistently to communicate with another system, an association may be established between data socket descriptor #0 312 and the application instance 306. By consistently, what is meant is that application instance 306 utilizes data socket descriptor #0 312 to communicate with another system more than a predetermined number of times within a given period of time, according to one embodiment. In another embodiment, consistently utilizing a data socket descriptor means that only a specific data socket descriptor is used in exclusion of all others over a given period of time.

FIG. 3A shows ADPL libraries which keep track of the server base socket 310 and various data socket descriptors 312, 314, 316, . . . , 318 opened by an application instance 306 for communication of data with one or more peer applications outside of the reference system 300. The data socket descriptors 312, 314, 316, . . . , 318 are used for the exchange of data with another system outside of the reference system 300.

The data socket descriptors 312, 314, 316, . . . , 318 are numbers that represent attributes and/or characteristics of different data exchanges between the application instance and one or more receiver hosts. Each data socket descriptors 312, 314, 316, . . . , 318 may have a size ranging from 12 to 48 bits, such as 32 bits in one embodiment.

Each of the application inspection layer 302 and the data inspection layer 304 utilize individual sets of APIs that are configured to piggyback on existing APIs, but add specialized functionality to any action performed using the existing APIs.

These new socket APIs and data protection APIs, and the type of application payload sent and received, do not disturb the intermediate security appliances such as firewall, Intrusion Prevention and Intrusion Detection, etc.

The application instance 306 utilizes the one or more server base socket(s) 310 with standard and/or private well-known port number(s) as a control socket, but opens a new data socket descriptor and allocates a different port number to the new data socket descriptor in order to handle actual functionality and data transfer between the reference system 300 and any other external or peer system. The server base socket 310 has the following attributes and/or characteristics:

1. A server and/or a source IP interface.
2. A standard and/or known server port number, e.g., TCP port, user datagram protocol (UDP) port, etc.
3. A maximum number of allowable waiting connections.
4. A maximum (and possibly minimum) application packet buffer size usable for transmitting and receiving data.
5. Other socket options provided by the operating system, the user, or an external input.

The above described attributes and/or characteristics may also be attributed to the plurality of allocated data socket descriptors 312, 314, 316, . . . , 318. When a connection is established between the reference system 300 and another system via the application instance 306, a data socket descriptor is allocated. The allocated data socket descriptor has the following attributes and/or characteristics:

1. A server and/or a source IP interface.
2. A standard and/or known server port number, e.g., TCP port, UDP port, etc.
3. A maximum number of allowable waiting connections.
4. Application packet buffer size for transmit and receive.
5. A port number of the transport of the allocated data socket descriptor (in the reference system 300).
6. An IP address of the peer data socket descriptor (in an external system) of the allocated data socket descriptor (usually, but not always, in TCP sockets).
7. A port number of the transport of the peer data socket descriptor of the allocated data socket descriptor in all cases of controlled port allocations by the application instance 306.
8. A maximum (and possibly minimum) application packet buffer size usable for transmitting data to and receiving data from (transmissions with) the peer data socket descriptor.

Apart from the above-described characteristics and/or attributes, additional characteristics that may be attributable to an allocated data socket descriptor include:

9. A first identifier (ID1): a globally unique identification number given for an entity (such as an enterprise, company, university, city subdivision, etc.) that utilizes the ADPL mechanism in the application instances or programmed for proprietary purposes.
10. A second ID (ID2): a unique identification number within the entity (not necessarily globally unique). Each ID2 represents a subdivision within the entity, such as an individual business unit within an enterprise, a water district within a city, etc., or programmed for proprietary purposes.

11. Secure base signature: a base signature or scrambled alphanumeric or numerical code used in the generation of signatures per data socket descriptor.
12. Secure runtime signature: a scrambled alphanumeric or numerical code used as a signature on a per data socket descriptor basis.
13. Application name: a name given to the application instance operating on the computing system.
14. Application ID: an identification number provided to the application instance operating on the computing system.
15. Process ID: an identification number provided to a particular process which is accountable for the data.
16. Server port: the particular port on the server on which data is received or sent.
17. Transport protocol: the particular transport protocol used to send data.
18. Base Crypto Version: the version of the cryptographic process used to encrypt data.
19. Co-Lo Need: Co-locationing criterions where applications or application instances may reside together in the same server, server pool, rack, pod, or data center.
20. Architecture Tier: a tier within the system architecture on which the (web, application, database, etc.) operates.
21. Storage Attachments: an attribute that describes how the storage is attached to the computing system (e.g., direct, network, distributed, etc.)
22. Proprietary Multi-Tenant Label: a label within the ADPL tag which designates some information selectable by the user.

These unique attributes when combined together in one of many different variations, are able to identify a data socket descriptor, and locks that data socket descriptor to one particular instance of a scaled-out application group. This allows for definitive identification of a data socket descriptor.

The inspection layer has capabilities to inspect applications at various granularity levels and collect all the runtime data from the applications under observation for threat modeling. As an application runs the inspection layer via a plug-in or API, the inspection layer collects data and sends it to an orchestrator for processing.

The inspection layer works as a probe on one or more reference systems where applications under observation are executing. The inspection layer attaches itself to each application in runtime and, through deep inspection, collects granular statistical and attribute data from the applications and any threats which are executed within the applications. All the gathered data is sent to the orchestrator for further processing. The orchestrator operates as a centralized server for collecting all the application details from various application servers (reference systems).

6. System Flow

Figure 3B:
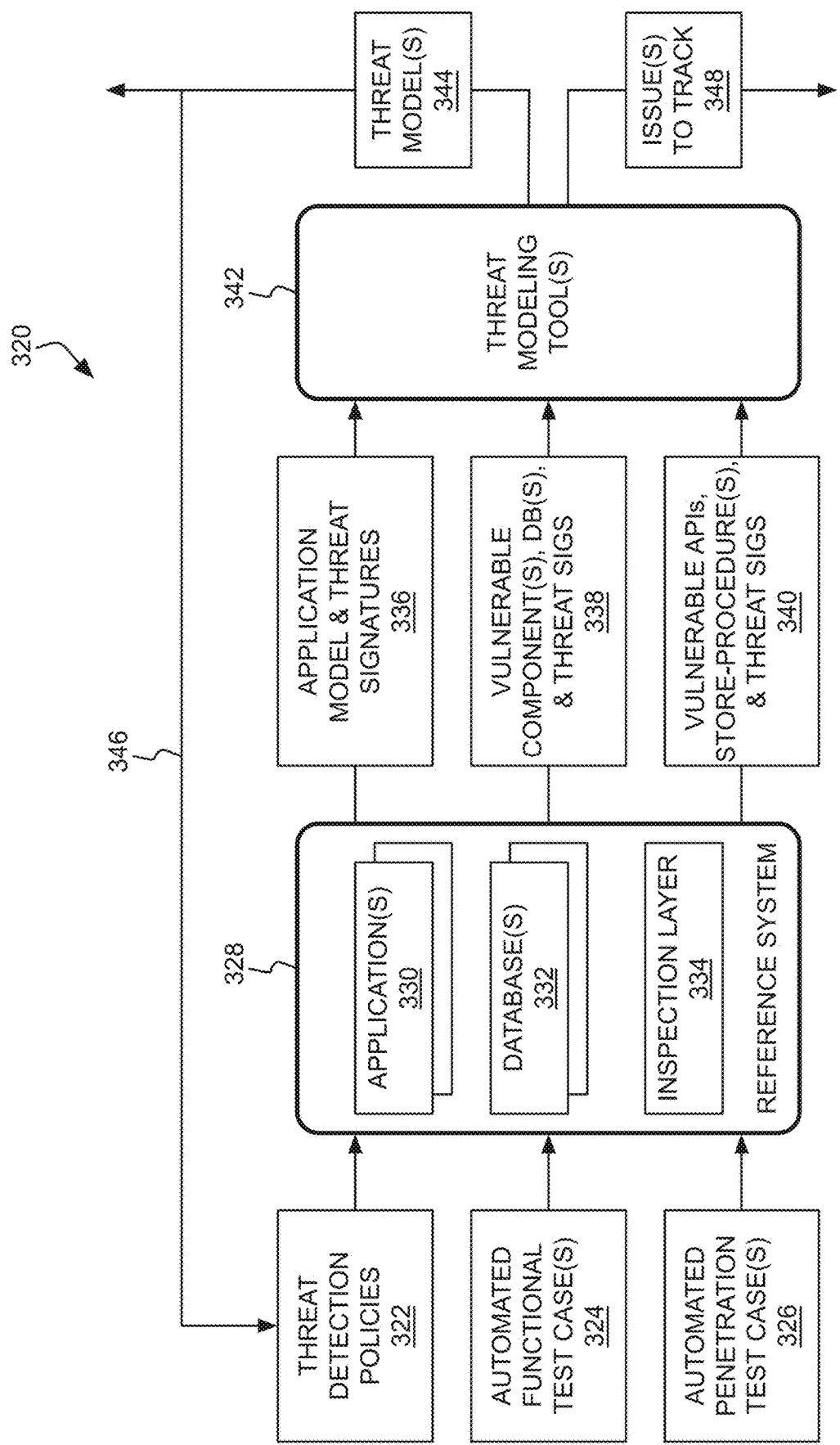
FIG. 3B shows an example system flow for deep application forensics and analytics.

FIG. 3B shows an example system flow 320 for deep application forensics and analytics. One or more applications 330 operating on a reference system 328 are monitored and analyzed by an inspection layer 334. Moreover, one or more databases 332 accessed by the reference system 328 and/or application(s) 330 thereof are also considered by the inspection layer 334. The inspection layer 334 is configured based on threat detection policies 332, which may be manually and/or automatically generated. These threat detection policies 332 may dictate goals, actions, responses, or any other aspects of the inspection layer 334 as it monitors and examines functioning of the various application(s) 330 and database(s) 332 of the reference system 328. Any components shown in FIG. 3B may be located remotely from the reference system 328, in various approaches.

As the reference system 328 is run, one or more automated functional test cases 324 may be executed on the reference system 328 in order to test particular functional capabilities of the reference system 328 and/or particular application(s) 330 thereof. The automated functional test cases 324 may be designed, constructed, generated, and executed automatically by a combination of an orchestrator (not shown) and the inspection layer 334. In other words, certain inputs are provided to the reference system 328 which are designed to trigger certain response(s) in order to test all the functionality of the reference system 328 and ensure proper functionality is available and not vulnerable to attack by unauthorized entities. Moreover, these automated functional test cases 324 may be developed specifically to test functionality which may be indicated as having vulnerabilities, such as reported by a threat modeling tool 342, as described later.

In one or more embodiments, certain automated functional test cases 324 may be designed to reveal components of the applications 330 and/or databases 332, such as individual processes, store-procedures, etc.

Moreover, one or more automated penetration test cases 326 may be executed on the reference system 328 in order to test particular vulnerabilities indicated for the reference system 328 and/or particular application(s) 330 thereof. In one embodiment, a penetration testing tool (e.g., pentesting tool) may be used to generate the various automated penetration test cases 326. This penetration testing application may communicate with a threat modeling tool(s) 342 in order to generate and keep up-to-date any penetration test cases 326 for analyzing responses from the reference system 328 to the stimulus to detect vulnerabilities of the reference system 328.

The automated penetration test cases 326 may be designed, constructed, generated, and executed automatically by a combination of the orchestrator and the inspection layer 334. In other words, certain inputs are provided to the reference system 328 as test cases which are designed to trigger certain response(s) in order to test certain identified vulnerabilities of the reference system 328 and ensure that the reference system 328 is not vulnerable to known issues, backdoors, code defects, etc., that may be discovered based on functioning of other systems and/or the reference system 328 itself, as reported back by the threat modeling tool(s) 342, as described in more detail later.

The inspection layer 334, alone or in combination with the orchestrator, provides information to one or more threat modeling tools 342. Some example information that the inspection layer 334 may provide includes, but is not limited to, an application model (e.g., dependency matrices) and threat signatures (e.g., based on detected vulnerabilities) 336, vulnerable component(s) and database(s) 338, vulnerable API(s) and store-procedure(s) 340, etc.

The one or more threat modeling tools 342 use these inputs in order to construct at least one threat model 344. The inputs may be provided in more than one format, in order to meet the input criteria for different threat modeling tools 342 that are used to generate the threat model(s) 344, e.g., structured data, unstructured data, proprietary formats, etc.

Moreover, in one approach, the one or more threat modeling tools 342 may produce one or more issues to track 348 (e.g., identified vulnerabilities, architectural anomalies, policy or operating weaknesses, etc.), which may be provided to another system, such as a ticketing system, bug tracking system, etc. In one embodiment, a GUI may be generated that is based on the one or more threat models 344 and/or the identified issue(s) to track 348.

The threat model(s) 344 and/or issue(s) to track 348 may be used as input 346 to further refine and shape the threat detection policies 322, such that continuous threat modeling is possible for the reference system 328 by the inspection layer 334, which will receive updated information to learn how to better track and detect vulnerabilities to the reference system 328.

7. Example Embodiments

Figure 4:
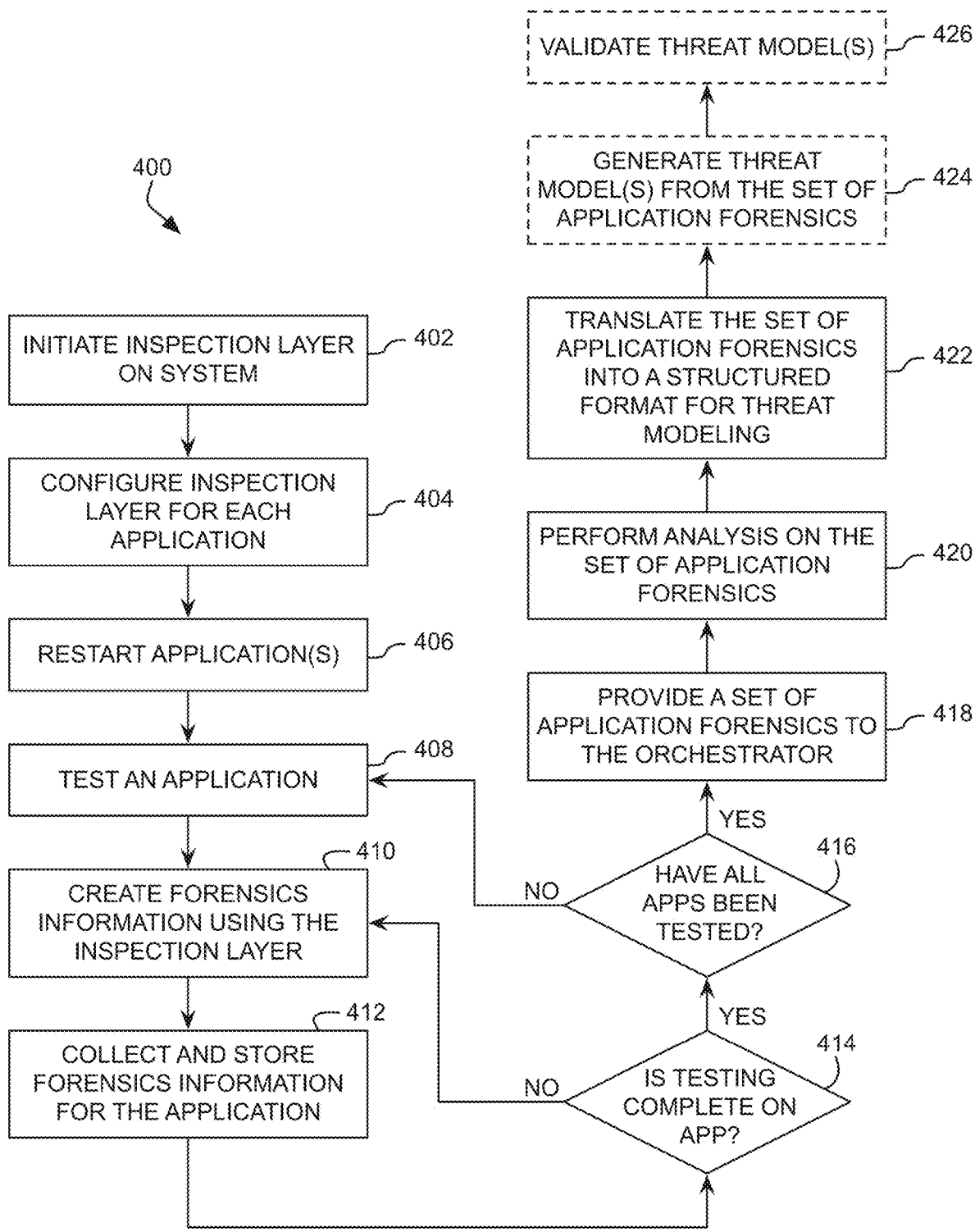
FIG. 4 is a flow diagram of an example method for deep application discovery and forensics.

FIG. 4 is a flow diagram of an example method 400 for deep application discovery and forensics. One or more operations illustrated in FIG. 4 may be modified, rearranged, or omitted all together. Accordingly, the particular sequence of operations illustrated in FIG. 4 should not be construed as limiting the scope of one or more embodiments. In one embodiment, method 400 may be executed by an orchestrator, a hardware appliance, a server device, or a system having at least one hardware processor. For the remainder of the descriptions of FIG. 4, method 400 will be described as being performed by a combination of the inspection layer on a reference system and an orchestrator.

In operation 402, the reference system initiates an inspection layer, which may include a data inspection layer and an application inspection layer. The orchestrator may cause the reference system to initiate the inspection layer on the reference system in an approach. The orchestrator may also initiate inspection layers on each system for which data and application discovery and forensics is desired, such as all systems within an enterprise, both local to the orchestrator and remote from the orchestrator, such as in the cloud or across one or more networks. Moreover, the orchestrator may provide an executable or some other file type to the reference system for installation of the inspection layer in an approach.

In operation 404, the reference system configures the inspection layer for each application that is configured for execution on the reference system. In an approach, configuration of the inspection layer may be performed remotely by the orchestrator. The configuration takes into account the type of application, OS of the reference system, and any other details and relevant information about each application to ensure the inspection layer is able to recognize requests sent and received by the application, along with any data that is sent and received by each application and/or accessed by any process of the various applications.

In operation 406, the inspection layer operating on the reference system restarts each application to allow the inspection layer to begin collecting information about the applications. In one embodiment, the applications may be restarted in a sandbox or preliminary production environment, to avoid harming any systems outside of the reference system during application and data forensics for the applications. Moreover, in an approach, the orchestrator may cause the reference system (and/or the inspection layer operating thereon) to restart the applications to begin data collection.

In operation 408, the inspection layer, operating on the reference system, tests each application based on the configuration. This testing may be performed serially or in parallel, and may be based on how the applications interact with one another, the various resources (including databases) of the reference system being tested, the number of applications, how the application is utilized by the reference system, etc.

In operation 410, the inspection layer, based on testing each application, generates forensics information relevant to each application and database of the reference system. The orchestrator also creates forensics information for any web-based applications and remote database resources accessed and/or interacted with by the reference system and applications thereof.

In operation 412, the inspection layer, and/or the reference system in conjunction with the inspection layer, stores the collected forensics information for the current application under test. The collected forensics information may be stored to a data repository, database, or some other suitable storage device, and may be associated with an identifier for the current application under test to which the collected forensics information is related. In a further embodiment, collected forensics information may be stored for every application configured for execution on the reference system to the data repository in association with respective identifiers.

In operation 414, the inspection layer, and/or the reference system in conjunction with the inspection layer, determines whether testing has been completed for the current application under test. This determination may be based on a time period for testing the application being reached, all functions and processes of the application being performed, the application starting and ceasing during its normal functional cycle for the reference system, or based on any other known method of determining completion of testing and forensics information collection for the application.

In operation 416, the inspection layer, and/or the reference system in conjunction with the inspection layer, determines whether all applications have been tested. This determination is based on whether any applications that are configured for execution on the reference system have not been run by the reference system during the testing period.

In operation 418, the inspection layer provides the orchestrator with a set of application forensics. The set of application forensics includes all of the forensics information for each application configured for execution on the reference system.

In an embodiment, when multiple systems have individual inspection layers collecting forensics information, each set of application forensics for a corresponding system may be stored by the orchestrator and associated with an identifier for the corresponding system.

In operation 420, the orchestrator performs analysis of the set of application forensics to reveal all aspects, details, connections, interactions, and vulnerabilities of the complete reference system to allow for accurate threat modeling.

In operation 422, the orchestrator translates the set of application forensics into one or more structured (or unstructured) formats. The orchestrator performs this translation to convert the set of application forensics into a format which may be utilized by at least one threat modeling tool. Therefore, the orchestrator may know or learn of which threat modeling tool will be used to automatically select the format, or a user may select which format to use for conversion of the set of application forensics.

In operation 424, one or more threat modeling tools generate at least one threat model based on the formatted set of application forensics. Each threat modeling tool may have different strengths and weaknesses in regards to how they distinguish and weigh what characteristics lead to threats in the reference system. Therefore, it may be beneficial to have multiple different threat models generated based on the overall set of application forensics for the reference system.

In operation 426, the threat model(s) are validated, such as by the orchestrator or a component of the threat modeling tool, to ensure that they capture all aspects of the reference system and are capable of being utilized by the orchestrator or threat modeling tool to troubleshoot the reference system.

Figure 5:
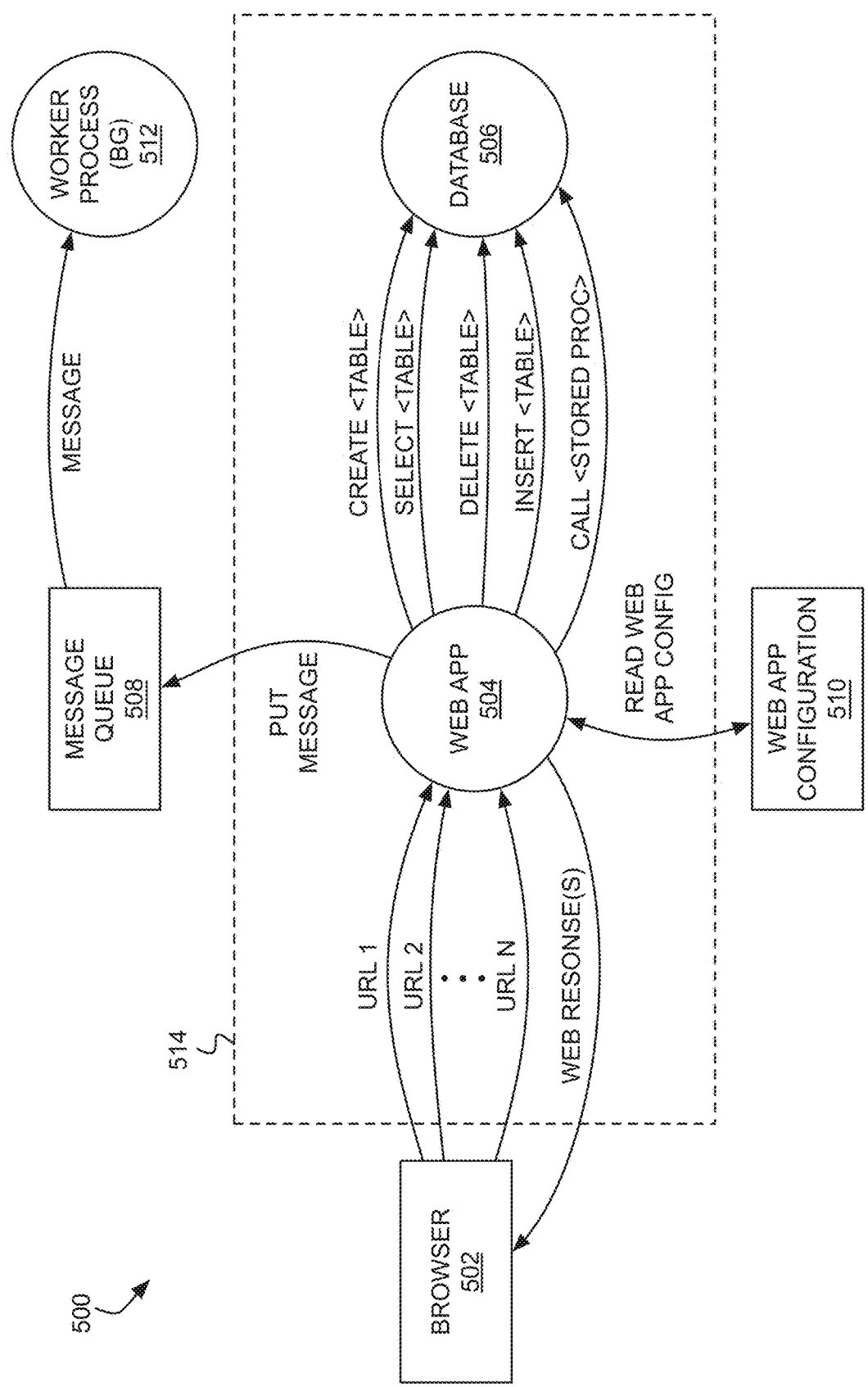
FIG. 5 shows an example application dependency map.

FIG. 5 shows an example application dependency map 500. The application dependency map 500 may be generated by an orchestrator, or some other analytics device, based on information gathered from a reference system using an inspection layer, in one embodiment.

The application dependency map 500 shows a conceptual connectivity diagram for each of the components of an enterprise application with a dashed line indicating a trust boundary 514 for the enterprise application. A threat model may be generated by leveraging deep application forensics provided by the inspection layer installed on the enterprise application. The trust boundary 514 may be determined based on the discovered interactions within and outside of the enterprise application.

The application dependency map 500 illustrates example interactions between the different components of the enterprise application. In this example, a browser 502 is in communication with a web application 504 via a plurality of URL requests that the browser 502 sends to the web application 504, which are responded to by the web application 504 with web response(s).

The application dependency map 500 also illustrates communication between the web application 504 and one or more database(s) 506. The web application 504 issues commands to the database 506. Example commands shown include, but are not limited to, create <table>, select <table>, delete <table>, insert <table>, and call <stored proc>. Other possible commands may also be issued by the web application 504 to the database(s) 506. Moreover, data may be sent from the database(s) 506 to the web application 504 in response to appropriate commands issued by the web application 504.

The application dependency map 500 shows configuration of the web application 510. This configuration 510 may be performed by the orchestrator, the reference system, or some other component capable of configuring the web application 504. Moreover, the system performing the configuration 510 may also read current configuration of the web application 504, in order to determine how to further configure the web application 504.

Also, the application dependency map 500 shows a message queue 508, to which the web application 504 may post messages, and from which one or more worker process(es) 512 (such as a background process) may access such messages put in the message queue 508 by the web application 504. The message queue 508 may also receive messages from other entities in addition to the web application 504, in an approach, which may be accessed by the web application 504 and/or the worker process(es) 512.

Each component of the enterprise application may have different threats that are more easily recognized, discovered, and identified based on the application dependency map 500. For example, some threats relevant to the web application 504 may be discovered based on the application dependency map 500. These threats may include, but are not limited to, a generic spoofing threat, a generic tampering threat, a generic repudiation threat, a specific information disclosure threat, a generic denial of service (DoS) threat, and a generic elevation threat (elevation of privilege).

In another example, some threats relevant to the database(s) 506 may be discovered based on the application dependency map 500. These threats may include, but are not limited to, a specific SQL injection, data exfiltration threat, information disclosure threat, a generic tampering threat, a generic repudiation threat, cross-site scripting threat, forgery threat, zero day vulnerabilities, remote code execution, reverse power shell execution, a generic information disclosure threat, and more advanced malware and ransomware threats to application and databases.

As these examples illustrate, the application dependency map 500 may be used to discover and label threats to the enterprise application that would otherwise be difficult or incredibly time-consuming to identify using conventional methods.

Figure 6:
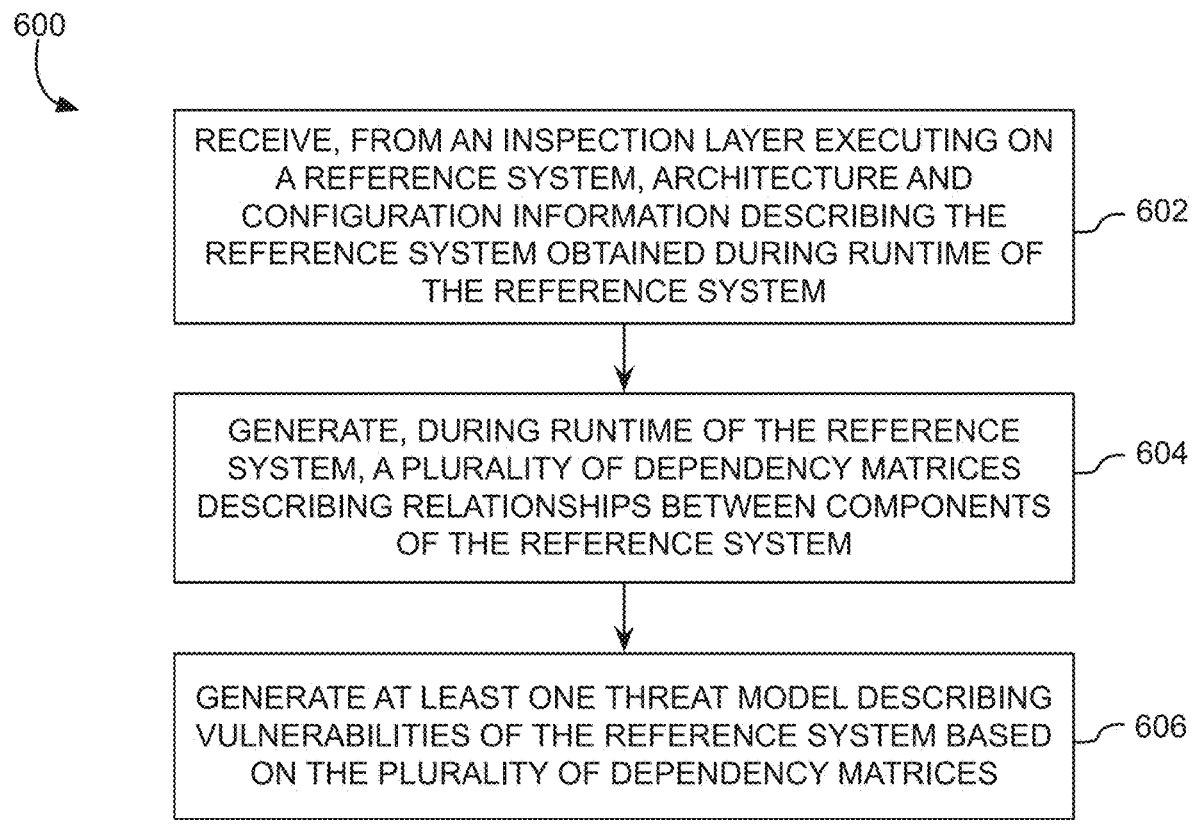
FIG. 6 is flow diagram of an example method for deep application discovery and forensics.

FIG. 6 is flow diagram of an example method 600 for deep application discovery and forensics. One or more operations illustrated in FIG. 6 may be modified, rearranged, or omitted all together. Accordingly, the particular sequence of operations illustrated in FIG. 6 should not be construed as limiting the scope of one or more embodiments. In various embodiments, method 600 may be executed by a hardware appliance, a server device, an orchestrator, a reference system, or a computing system having at least one hardware processor. For the remainder of the descriptions of FIG. 6, method 600 will be described as being performed by a computing device in communication with a reference system for which a threat model is to be developed.

In operation 602, the computing device receives, from an inspection layer executing on a reference system, architecture and configuration information describing the reference system obtained during runtime of the reference system. The inspection layer may be a plug-in or some other executable or service configured for deep inspection functionality on the reference system for collecting granular statistical, vulnerability, and attribute data from applications and databases of the reference system. In an approach, information describing all applications that are spawned during a time period of running the reference system may be collected and sent to the computing device for analysis.

Any suitable time period of running the reference system may be chosen for conducting an initial analysis of the reference system, such as 5 minutes, 30 minutes, one hour, 12 hours, 24 hours, three days, one week, two weeks, one month, etc.

Moreover, in an embodiment, once the initial time period has expired, the inspection layer will continue to monitor and collect data from the reference system. The inspection layer updates the data sent to the computing device to ensure that the computing device has an up-to-date snapshot of the applications and databases of the reference system. This allows for an accurate threat model to be produced at any given time for the reference system based on up-to-the-minute information collected by the inspection layer.

For example, the architecture and configuration information may be obtained during a pre-production period of time as initial information, in one approach. In another approach, either in conjunction with the initial information or as a standalone embodiment, the architecture and configuration information may be obtained during runtime of the reference system as it is used in normal operation.

In an embodiment, the architecture and configuration information collected by the inspection layer may include identities of a plurality of applications that are configured to execute on the reference system. In further embodiments, the architecture and configuration information may include every individual process executable by the plurality of applications, URIs including URLs for all web resources referenced by the plurality of applications, and identities of all APIs configured to be invoked by any of the plurality of applications.

The identity of an application that is sent to the computing device from the inspection layer may include, but is not limited to, a name for the respective application, one or more identifiers for processes executed by the respective application (e.g., PIDs), a unique fingerprint attributable to the respective application (e.g., a secure hash algorithm like SHA-2, e.g., SHA-256, SHA-512, etc.).

In an approach, each process spawned by the applications may be described by an associated identifier (e.g., PID), a hash, or some other appropriate identifying marker or code. In an approach, all individual processes spawned by the applications during the time period of running the reference system may be collected and sent to the computing device for analysis.

In accordance with one embodiment, the architecture and configuration information collected by the inspection layer may include one or more exchanges between any of the plurality of applications and one or more platforms, such as embedded platforms, Internet of Things (TOT) platforms, cloud platforms, etc.

In a further embodiment, the architecture and configuration information collected by the inspection layer may include identities of a plurality of databases that are accessible to the reference system, storage tables utilized by the plurality of applications to access any of the plurality of databases, and/or store-procedures invoked between the plurality of applications and any of the plurality of databases.

In one embodiment, the inspection layer may be configured to attach to each application that is spawn by the reference system in order to identify and collect information related to the individual applications and databases during runtime of the reference system.

The architecture and configuration information collected by the inspection layer may include, in an approach, communication activity of the reference system, including inter-application communication, intra-application communication, and inter-process communication.

In an approach, the inspection layer may include two components: an application inspection layer configured for monitoring and analyzing each application of the reference system, on an individual basis (e.g., an application inspection layer is operating for each application); and a data inspection layer configured for monitoring and analyzing each database accessed by the applications and OS of the reference system, on an individual basis (e.g., a data inspection layer is operating for each identified database).

In operation 604, the computing device generates, during runtime of the reference system, a plurality of dependency matrices describing relationships between components of the reference system.

In various embodiments, the computing device may generate an application dependency matrix that describes interdependencies between the plurality of applications, a storage dependency matrix based on the storage tables and the store-procedures, a process-level dependency matrix based on the URIs and every individual process executed by the plurality of applications, an API-level dependency matrix based on the identities of the APIs, and/or a communication matrix describing inter-application communication, intra-application communication, and inter-process communication.

The application dependency matrix describes interdependencies between the plurality of applications. This matrix may describe how applications interact with one another, which APIs are used for accessing different resources, frequency of interaction, remote resource access by specific applications, etc.

The storage dependency matrix may be based on the storage tables, the store procedures, identities of the databases, where the databases are located, which specific applications accessed specific databases, etc.

The process-level dependency matrix may be based on the URIs, every individual process executed by the plurality of applications, where the resource referenced by specific URIs is located (local, remote, etc.), which application accessed specific URIs, etc.

The API-level dependency matrix may be based on the identities of the APIs, which application invoked the API, what the API is configured to access, etc.

In operation 606, the computing device generates at least one threat model describing vulnerabilities of the reference system based on the plurality of dependency matrices.

According to one embodiment, the threat model(s) may include any of the following: a specific threat model for each application flow based on at least the application dependency matrix, a specific threat model for each database accessed by any of the plurality of applications, a specific threat model for each API flow based on at least the API-level dependency matrix, detected vulnerabilities, and/or a specific threat model for each URI referenced by any of the plurality of applications based on at least process-level dependency matrix.

According to an approach, the architecture and configuration information may be converted into a plurality of file formats for use by different threat modeling tools to generate at least one threat model describing vulnerabilities of the reference system during runtime of the reference system. Example formats include, but are not limited to, JSON, BSON, MessagePack, YAML, HDFS, syslogs, LEEF, etc.

In one embodiment, the computing device may receive, from the inspection layer during runtime of the reference system, updated architecture and configuration information describing changes to the reference system. These changes may include, but are not limited to: a new application, a discretely released application, an updated application, a removed application, and a change to any of the plurality of databases. In response to the updated architecture and configuration information the computing device generates, during runtime of the reference system, at least one updated dependency matrix describing relationships between components of the reference system. Moreover, the computing device generates, during runtime of the reference system, at least one updated threat model describing vulnerabilities of the reference system based on the updated architecture and configuration information.

In an alternate embodiment, the computing device may convert the updated architecture and configuration information (possibly including the at least one updated dependency matrix) to one or more formats for use by at least one threat modeling tool to generate the updated threat model to maintain an up-to-the-minute threat model for the reference system.

In one approach, the computing device may display, on a display of the computing device or some other system, a representation of a threat model in a graphical user interface (GUI). Moreover, in some approaches, the computing device may display a vulnerability report for the reference system identifying internal elements of the reference system which are vulnerable to threats in the GUI. these internal elements may include any of the components previously described with micro-level details allowing for very accurate diagnosis of the threats.

In one approach, multiple threat models may be generated by a plurality of threat modeling tools based on the architecture and configuration information, the dependency matrices, and/or any portion or subset thereof. In this approach, the computing device may format one or more of the dependency matrices and/or the architecture and configuration information into one or more specific data formats suitable for specific threat modeling tools prior to providing this information to the plurality of threat modeling tools.

Figure 7:
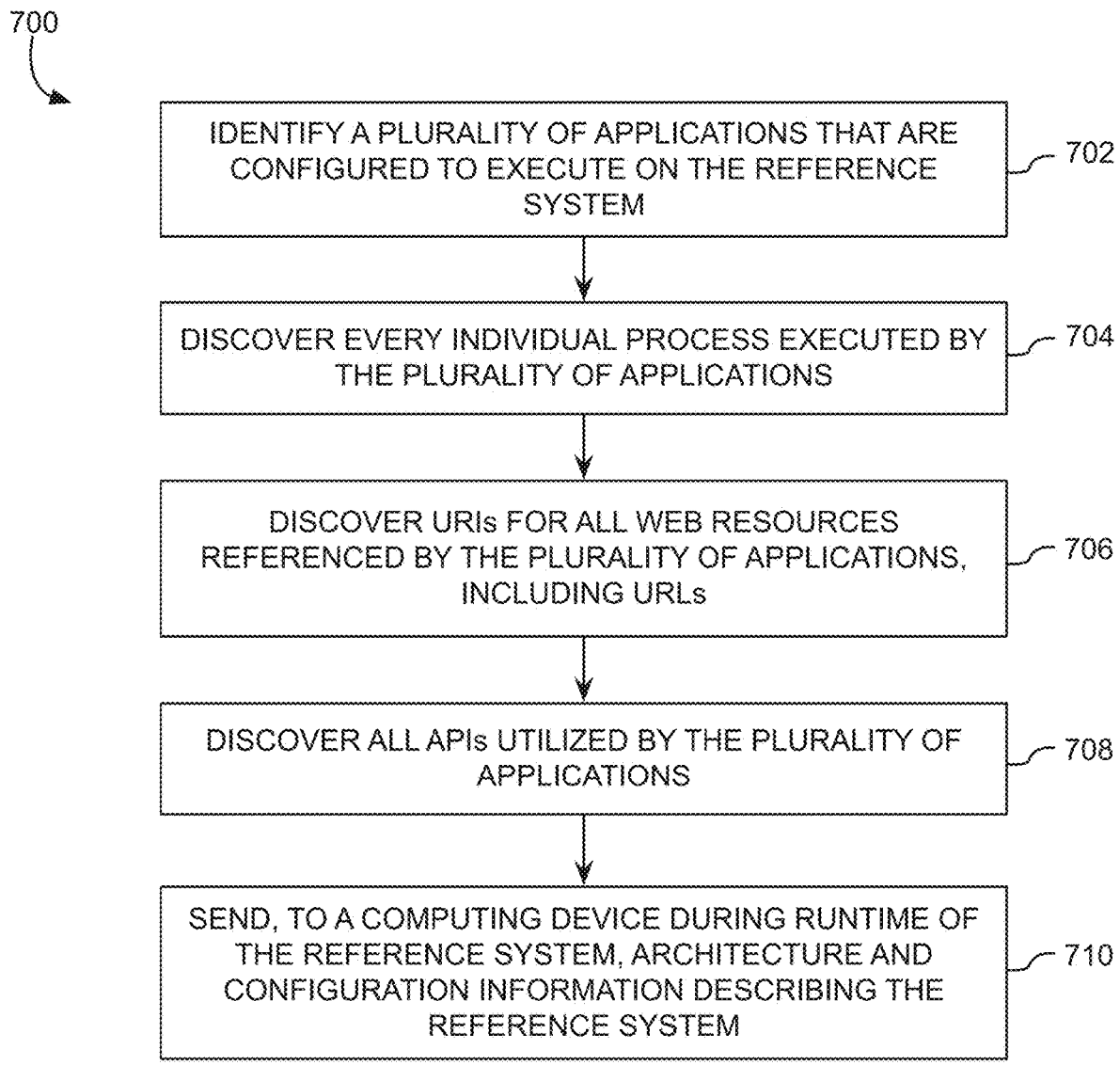
FIG. 7 is flow diagram of an example method for deep application discovery and forensics.

FIG. 7 is flow diagram of an example method 700 for deep application discovery and forensics. One or more operations illustrated in FIG. 7 may be modified, rearranged, or omitted all together. Accordingly, the particular sequence of operations illustrated in FIG. 7 should not be construed as limiting the scope of one or more embodiments. In various embodiments, method 700 may be executed by a hardware appliance, a server device, an orchestrator, a reference system, or a computing system having at least one hardware processor. For the remainder of the descriptions of FIG. 7, method 700 will be described as being performed by an inspection layer executing on a reference system for which a threat model is to be developed.

In operation 702, the inspection layer identifies a plurality of applications that are configured to execute on the reference system. In an embodiment, the inspection layer may identify the plurality of applications by discovering all application components associated with each of the plurality of applications, and determining, for each respective application of the plurality of applications: a name for the respective application, identifiers for processes executed by the respective application, and/or a unique fingerprint attributable to the respective application.

In operation 704, the inspection layer discovers every individual process executed by the plurality of applications. This discovery may be performed using any techniques described herein, or commonly understood.

In operation 706, the inspection layer discovers URIs for all web resources referenced by the plurality of applications, including URLs. This discovery may be performed using any techniques described herein, or commonly understood.

In operation 708, the inspection layer discovers all APIs utilized by the plurality of applications. This discovery may be performed using any techniques described herein, or commonly understood. In an approach, all APIs that are invoked by the applications during the time period of running the reference system may be collected and sent to the computing device for analysis.

In operation 710, the inspection layer sends, to a computing device during runtime of the reference system, architecture and configuration information describing the reference system.

In one embodiment, the architecture and configuration information includes: identities of the plurality of applications, identities of every individual process executed by the plurality of applications, identification of the URIs for all web resources referenced by the plurality of applications, and identification of the APIs utilized by the plurality of applications.

In one approach, the inspection layer, during runtime of the reference system, may perform one or more threat and vulnerability penetration tests on at least one of the plurality of applications. Based on the one or more threat and vulnerability penetration tests, the inspection layer, during runtime of the reference system, may detect vulnerabilities to the at least one application exposed during the one or more threat and vulnerability penetration tests.

In one embodiment, the inspection layer may accumulate vulnerable elements of one or more of the applications based on the vulnerabilities exposed during the one or more threat and vulnerability penetration tests.

The vulnerable elements may be any of the following: individual application processes performed by the application(s), APIs called by the application(s), URIs, including URLs, invoked by the application(s), and/or database exchanges performed by the application(s).

In one approach, the inspection layer may perform, during runtime of the reference system, one or more functional tests on one or more of the applications. In response to the one or more functional tests during runtime of the reference system, any of the following may be detected: each individual application process performed by the application(s), all APIs called by the application(s), all URIs, including URLs, invoked by the application(s), all store-procedures invoked by the application(s), and/or all databases accessed by the application(s).

Moreover, the inspection layer, during runtime of the reference system, may detect vulnerabilities to the application(s) that are exposed during the one or more functional tests.

In an approach, based on the detected vulnerabilities to the application(s), one or more threat signatures directed to an element of the reference system may be generated for use in generating a specific threat model. Multiple specific threat models may be generated, one for each element which may cause a vulnerability to the reference system. Some example elements include, but are not limited to, a configuration of one of the applications, an application process for one or more of the applications, an API invoked by any of the applications, an URI and/or URL invoked by any of the applications, a database exchange, etc.

In one embodiment, method 700 may include the inspection layer determining, during runtime of the reference system, runtime behavior of the reference system and differences between versions of any of the applications based on performing the one or more test cases.

Figure 8:
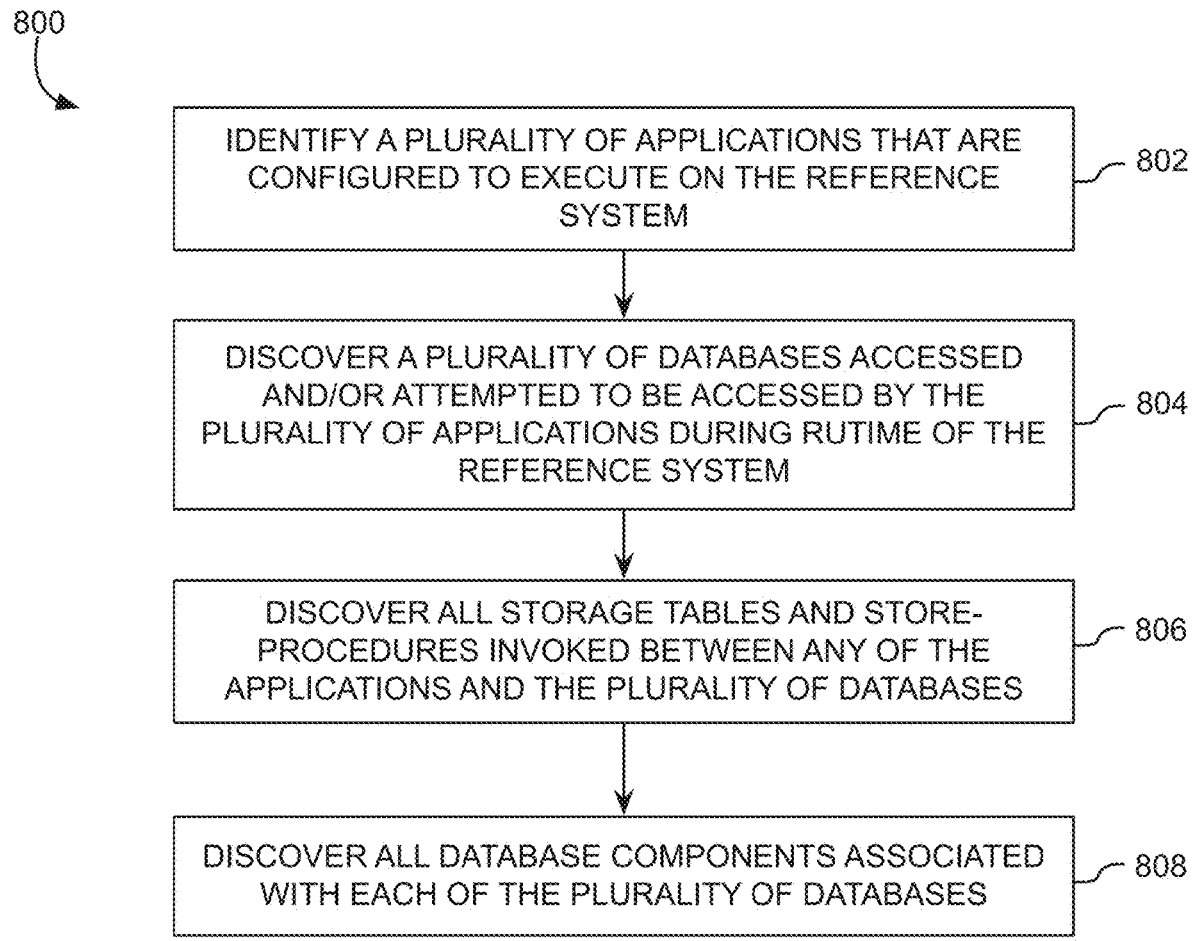
FIG. 8 is flow diagram of an example method for deep application discovery and forensics.

FIG. 8 is flow diagram of an example method 800 for deep application discovery and forensics. One or more operations illustrated in FIG. 8 may be modified, rearranged, or omitted all together. Accordingly, the particular sequence of operations illustrated in FIG. 8 should not be construed as limiting the scope of one or more embodiments. In one embodiment, method 800 may be executed by a hardware appliance, a server device, or a computing system having at least one hardware processor. For the remainder of the descriptions of FIG. 8, method 800 will be described as being performed by an inspection layer executing on a reference system.

In operation 802, the inspection layer identifies a plurality of applications executing on the reference system. These applications may be discovered during runtime of the reference system in an approach.

In addition, the inspection layer identifies each of the plurality of applications with information that may be used by an orchestrator, or some other computing device, for distinguishing each application, and its individual components, from one another.

In operation 804, the inspection layer discovers a plurality of databases accessed and/or attempted to be accessed by the plurality of applications during runtime of the reference system.

In operation 806, the inspection layer discovers all storage tables and store-procedures invoked between any of the applications and the plurality of databases. This is useful for relational databases, but any access information for non-relational databases may also be collected by the inspection layer.

In operation 808, the inspection layer discovers, during runtime of the reference system, all database components associated with each of the plurality of databases.

In one embodiment, the inspection layer may send this information to a computing device for procuring a threat model for one or more of the databases. A database may be identified by a name, physical or logical address, fingerprint attributable to the respective database, etc. In an approach, information describing all databases that are accessed and/or interacted with by the applications during the time period of running the reference system may be collected and sent to the computing device for analysis.

In one embodiment, the plurality of databases may include one or more relational databases and/or one or more document databases (or NoSQL databases).

In one embodiment, the inspection layer may be configured to attach to each application that is spawn by the reference system in order to identify and collect interactions between individual applications and databases internal to and external of the reference system during runtime.

According to an approach, method 800 may include the inspection layer discovering database-specific information that includes internal processes spawned by the plurality of databases, APIs invoked by the internal processes, data tables related to the plurality of databases, structured and unstructured data fields related to the plurality of databases, and/or types of data exchanged between any of the plurality of databases.

Based on this information, the computing device may identify vulnerabilities to the plurality of databases during runtime of the reference system, in response to this information being sent from the inspection layer to the computing device.

In one approach, method 800 may include the computing device, during runtime of the reference system, detecting vulnerabilities to the reference system based on configuration of any of the plurality of databases. Moreover, the computing device may identify vulnerabilities to the databases during runtime of the reference system based on the data collected and sent by the inspection layer. This allows for faster response to such detected vulnerabilities, and allows changes to be made to the reference system to address these detected vulnerabilities before they allow for significant breaches to occur.

In an approach, based on the vulnerabilities to the reference system (based on data access and database configuration), one or more threat signatures directed to an element of the reference system may be generated for use in generating a specific threat model. Multiple specific threat models may be generated, one for each element which may cause a vulnerability to the reference system. Some example elements include, but are not limited to, a storage table for any of the databases, a store-procedure used for any of the databases, a configuration of any of the databases, a database component associated with any of the databases, etc.

To enable a clear understanding of the technological concepts described herein, the particular methods described herein include specific operations, which may be performed in a specific order, or one or more of the operations of a particular method may be rearranged and/or omitted while remaining within the contemplated scope of the technology disclosed herein. Moreover, different methods, and/or operations thereof, may be combined, rearranged, omitted, and/or executed in parallel to create different methods that are also within the contemplated scope of the technology disclosed herein. Additionally, while the methods described herein may omit or briefly summarize some of the details of the technologies disclosed herein for clarity, any details described in any of the paragraphs herein may be combined with the described operations to provide a more comprehensive understanding of these methods and related technologies.

8. Miscellaneous; Extensions

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
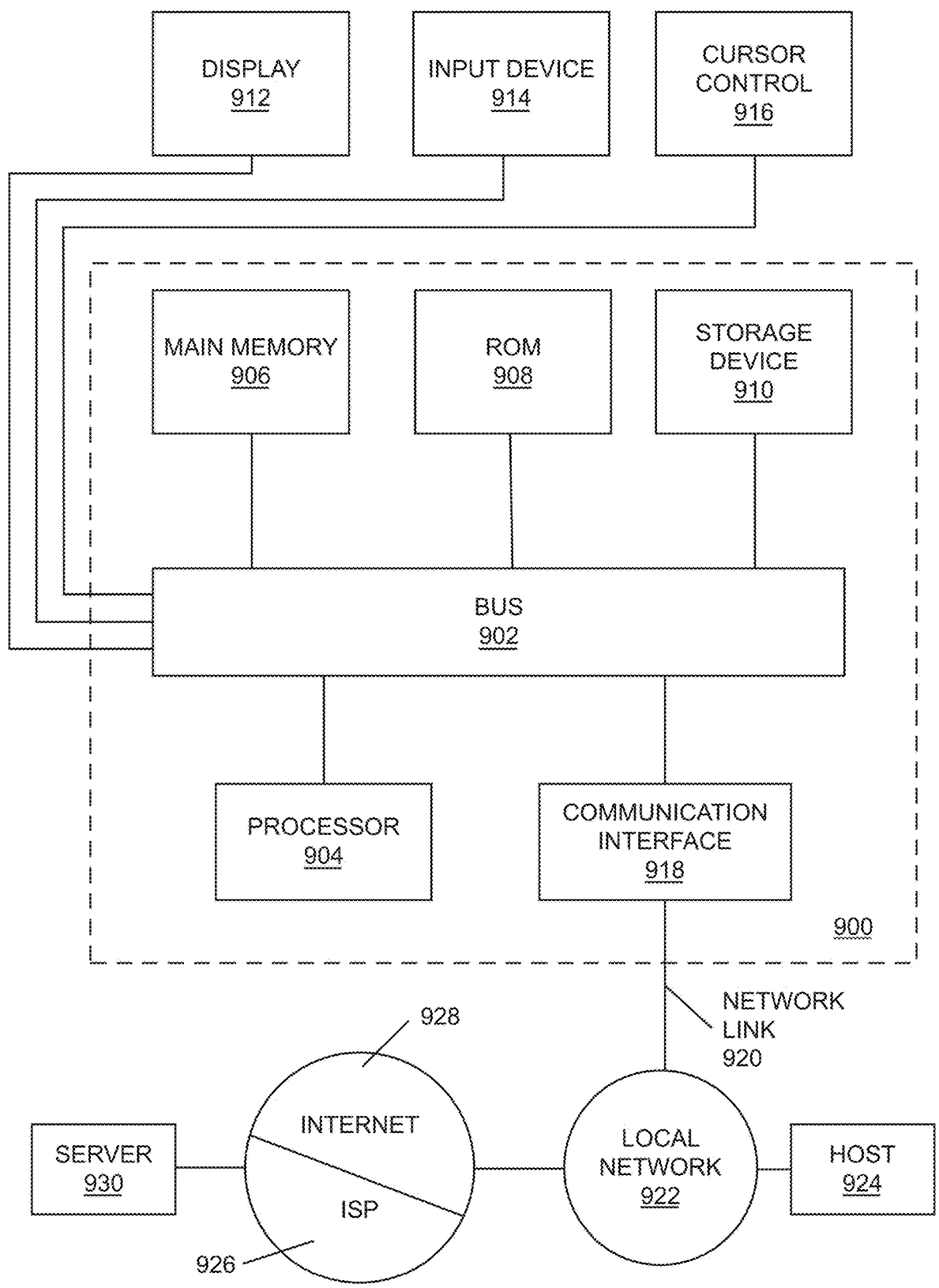
FIG. 9 shows a block diagram of an example computing system that may implement the features and processes of FIGS. 1-8.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or solid state disk, is provided and coupled to bus 902 for storing information and instructions.

Computer system 900 may be coupled via bus 902 to a display 912, such as a liquid crystal display (LCD), plasma display, electronic ink display, cathode ray tube (CRT) monitor, or any other kind of device for displaying information to a computer user. An input device 914, including alphanumeric and other keys, may be coupled to bus 902 for communicating information and command selections to processor 904. Alternatively or in addition, the computer system 900 may receive user input via a cursor control 916, such as a mouse, a trackball, a trackpad, a touchscreen, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. The display 912 may be configured to receive user input via one or more pressure-sensitive sensors, multi-touch sensors, and/or gesture sensors. Alternatively or in addition, the computer system 900 may receive user input via a microphone, video camera, and/or some other kind of user input device (not shown).

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical, solid-state or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 900 can receive the data from the network and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

10. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

Variations of the disclosed embodiments are also possible, and the explicit description thereof in this document is not required in order to provide a person having ordinary skill in the art with the ability to conceive of such variations when reading the present descriptions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    identifying, by an inspection layer executing on a reference system, a plurality of applications that are configured to execute on the reference system;
    discovering, by the inspection layer, every individual process executed by the plurality of applications;
    discovering, by the inspection layer, uniform resource identifiers (URIs) for all web resources referenced by the plurality of applications including uniform resource locators (URLs);
    discovering, by the inspection layer, all application programming interfaces (APIs) utilized by the plurality of applications;
    sending, by the inspection layer to a computing device during runtime of the reference system, architecture and configuration information describing the reference system, the architecture and configuration information comprising:
        identities of the plurality of applications;
        identities of every individual process executed by the plurality of applications;
        identification of the URIs for all web resources referenced by the plurality of applications; and
        identification of the APIs utilized by the plurality of applications;
    performing, during runtime of the reference system, one or more threat and vulnerability penetration tests on at least one of the plurality of applications; and
    detecting, by the inspection layer during runtime of the reference system, vulnerabilities to the at least one application exposed during the one or more threat and vulnerability penetration tests.

2. The method as recited in claim 1, wherein identifying the plurality of applications comprises:
    discovering, by the inspection layer, all application components associated with each of the plurality of applications; and
    determining, by the inspection layer, for each respective application of the plurality of applications:
        a name for the respective application;
        identifiers for processes executed by the respective application; and
        a unique fingerprint attributable to the respective application.

3. The method as recited in claim 1, further comprising:
    receiving, by the inspection layer, threat detection policies based on one or more vulnerability graphs, at least one vulnerability graph being based on the architecture and configuration information describing the reference system, wherein at least one of the data protection policies indicates a specific threat to one or more of the plurality of applications.

4. The method as recited in claim 1, further comprising accumulating, by the inspection layer, vulnerable elements of the at least one of the plurality of applications based on the vulnerabilities exposed during the one or more threat and vulnerability penetration tests, the vulnerable elements being selected from a group consisting of:
    individual application processes performed by the at least one of the plurality of applications;

APIs called by the at least one of the plurality of applications;
URIs, including URLs, invoked by the at least one of the plurality of applications; and
database exchanges performed by the at least one of the plurality of applications.

5. The method as recited in claim 1, further comprising:
performing, by the inspection layer during runtime of the reference system, one or more functional tests on at least one of the plurality of applications;
detecting, by the inspection layer during runtime of the reference system, vulnerabilities to the at least one application exposed during the one or more functional tests; and
generating, based on the vulnerabilities to the at least one application, one or more threat signatures directed to an element of the reference system for use in generating a specific threat model, the element being selecting from a group comprising:
a configuration of one of the plurality of applications;
an application process;
an API;
an URI;
an URL; and
a database exchange.

6. The method as recited in claim 5, further comprising:
in response to the one or more functional tests during runtime of the reference system:
detecting, by the inspection layer, each individual application process performed by the at least one of the plurality of applications;
detecting, by the inspection layer, all APIs called by the at least one of the plurality of applications; and
detecting, by the inspection layer, all URIs, including URLs, invoked by the at least one of the plurality of applications.

7. The method as recited in claim 5, further comprising determining, by the inspection layer during runtime of the reference system, runtime behavior of the reference system and differences between versions of the plurality of applications based on performing the one or more functional cases.

8. A non-transitory computer readable medium comprising a set of instructions that, when executed by one or more processors, cause the one or more processors to execute operations comprising:
identifying, by an inspection layer executing on a reference system, a plurality of applications that are configured to execute on the reference system;
discovering, by the inspection layer, every individual process executed by the plurality of applications;
discovering, by the inspection layer, uniform resource identifiers (URIs) for all web resources referenced by the plurality of applications including uniform resource locators (URLs);
discovering, by the inspection layer, all application programming interfaces (APIs) utilized by the plurality of applications;
sending, by the inspection layer to a computing device during runtime of the reference system, architecture and configuration information describing the reference system, the architecture and configuration information comprising:
identities of the plurality of applications;
identities of every individual process executed by the plurality of applications;
identification of the URIs for all web resources referenced by the plurality of applications; and
identification of the APIs utilized by the plurality of applications;
performing, during runtime of the reference system, one or more threat and vulnerability penetration tests on at least one of the plurality of applications; and
detecting, by the inspection layer during runtime of the reference system, vulnerabilities to the at least one application exposed during the one or more threat and vulnerability penetration tests.

9. The non-transitory computer readable medium as recited in claim 8, wherein identifying the plurality of applications comprises:
discovering, by the inspection layer, all application components associated with each of the plurality of applications; and
determining, by the inspection layer, for each respective application of the plurality of applications:
a name for the respective application;
identifiers for processes executed by the respective application; and
a unique fingerprint attributable to the respective application.

10. The non-transitory computer readable medium as recited in claim 8, wherein the operations further comprise:
receiving, by the inspection layer, threat detection policies based on one or more vulnerability graphs, at least one vulnerability graph being based on the architecture and configuration information describing the reference system, wherein at least one of the data protection policies indicates a specific threat to one or more of the plurality of applications.

11. The non-transitory computer readable medium as recited in claim 8, wherein the operations further comprise accumulating, by the inspection layer, vulnerable elements of the at least one of the plurality of applications based on the vulnerabilities exposed during the one or more threat and vulnerability penetration tests, the vulnerable elements being selected from a group consisting of:
individual application processes performed by the at least one of the plurality of applications;
APIs called by the at least one of the plurality of applications;
URIs, including URLs, invoked by the at least one of the plurality of applications; and
database exchanges performed by the at least one of the plurality of applications.

12. The non-transitory computer readable medium as recited in claim 8, wherein the operations further comprise:
performing, by the inspection layer during runtime of the reference system, one or more functional tests on at least one of the plurality of applications;
detecting, by the inspection layer during runtime of the reference system, vulnerabilities to the at least one application exposed during the one or more functional tests; and
generating, based on the vulnerabilities to the at least one application, one or more threat signatures directed to an element of the reference system for use in generating a specific threat model, the element being selecting from a group comprising:
a configuration of one of the plurality of applications;
an application process;
an API;
an URI;
an URL; and
a database exchange.

13. The non-transitory computer readable medium as recited in claim 12, wherein the operations further comprise:
in response to the one or more functional tests during runtime of the reference system:
detecting, by the inspection layer, each individual application process performed by the at least one of the plurality of applications;
detecting, by the inspection layer, all APIs called by the at least one of the plurality of applications; and
detecting, by the inspection layer, all URIs, including URLs, invoked by the at least one of the plurality of applications.

14. The non-transitory computer readable medium as recited in claim 12, wherein the operations further comprise determining, by the inspection layer during runtime of the reference system, runtime behavior of the reference system and differences between versions of the plurality of applications based on performing the one or more functional cases.

15. A system comprising:
one or more processors; and
a non-transitory computer readable medium comprising a set of instructions that, when executed by the one or more processors, cause the one or more processors to execute operations comprising:
identifying, by an inspection layer executing on a reference system, a plurality of applications that are configured to execute on the reference system;
discovering, by the inspection layer, every individual process executed by the plurality of applications;
discovering, by the inspection layer, uniform resource identifiers (URIs) for all web resources referenced by the plurality of applications including uniform resource locators (URLs);
discovering, by the inspection layer, all application programming interfaces (APIs) utilized by the plurality of applications;
sending, by the inspection layer to a computing device during runtime of the reference system, architecture and configuration information describing the reference system, the architecture and configuration information comprising:
identities of the plurality of applications;
identities of every individual process executed by the plurality of applications;
identification of the URIs for all web resources referenced by the plurality of applications; and
identification of the APIs utilized by the plurality of applications;
performing, during runtime of the reference system, one or more threat and vulnerability penetration tests on at least one of the plurality of applications; and
detecting, by the inspection layer during runtime of the reference system, vulnerabilities to the at least one application exposed during the one or more threat and vulnerability penetration tests.

16. The system as recited in claim 15, wherein identifying the plurality of applications comprises:
discovering, by the inspection layer, all application components associated with each of the plurality of applications; and
determining, by the inspection layer, for each respective application of the plurality of applications:
a name for the respective application;
identifiers for processes executed by the respective application; and
a unique fingerprint attributable to the respective application.

17. The system as recited in claim 15, wherein the operations further comprise:
receiving, by the inspection layer, threat detection policies based on one or more vulnerability graphs, at least one vulnerability graph being based on the architecture and configuration information describing the reference system, wherein at least one of the data protection policies indicates a specific threat to one or more of the plurality of applications.

18. The system as recited in claim 15, wherein the operations further comprise accumulating, by the inspection layer, vulnerable elements of the at least one of the plurality of applications based on the vulnerabilities exposed during the one or more threat and vulnerability penetration tests, the vulnerable elements being selected from a group consisting of:
individual application processes performed by the at least one of the plurality of applications;
APIs called by the at least one of the plurality of applications;
URIs, including URLs, invoked by the at least one of the plurality of applications; and
database exchanges performed by the at least one of the plurality of applications.

19. The system as recited in claim 15, wherein the operations further comprise:
performing, by the inspection layer during runtime of the reference system, one or more functional tests on at least one of the plurality of applications;
detecting, by the inspection layer during runtime of the reference system, vulnerabilities to the at least one application exposed during the one or more functional tests; and
generating, based on the vulnerabilities to the at least one application, one or more threat signatures directed to an element of the reference system for use in generating a specific threat model, the element being selecting from a group comprising:
a configuration of one of the plurality of applications;
an application process;
an API;
an URI;
an URL; and
a database exchange.

20. The system as recited in claim 19, wherein the operations further comprise:
in response to the one or more functional tests during runtime of the reference system:
detecting, by the inspection layer, each individual application process performed by the at least one of the plurality of applications;
detecting, by the inspection layer, all APIs called by the at least one of the plurality of applications; and
detecting, by the inspection layer, all URIs, including URLs, invoked by the at least one of the plurality of applications.

* * * * *